US008805346B1

(12) United States Patent
Zhang et al.

(10) Patent No.: US 8,805,346 B1
(45) Date of Patent: Aug. 12, 2014

(54) CALLER INFORMATION RETRIEVAL SYSTEM FOR UNAVAILABLE CALLS

(75) Inventors: Ming Zhang, Bellevue, WA (US); Jun Shen, Redmond, WA (US); Yung Shirley Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 616 days.

(21) Appl. No.: 11/735,391

(22) Filed: Apr. 13, 2007

(51) Int. Cl.
*H04M 3/42* (2006.01)

(52) U.S. Cl.
USPC ........................................ 455/415; 455/414.1

(58) Field of Classification Search
CPC ... H04W 8/183; H04W 4/16; H04M 3/42042; H04M 1/575; H04M 3/42221; H04M 3/42382
USPC .................. 455/414.1, 414.2, 415, 405–408; 379/88.19–88.22, 67.1, 93.23, 142.06, 379/202.01
See application file for complete search history.

(56) References Cited

U.S. PATENT DOCUMENTS

| | | | | |
|---|---|---|---|---|
| 5,930,701 | A * | 7/1999 | Skog ............................ | 455/415 |
| 6,032,044 | A * | 2/2000 | Shannon et al. .............. | 455/433 |
| 6,400,947 | B1 * | 6/2002 | Bright et al. ................ | 455/412.1 |
| 6,496,691 | B1 * | 12/2002 | Easley et al. ................... | 455/415 |
| 6,891,940 | B1 * | 5/2005 | Bhandari et al. ........... | 379/142.06 |
| 7,079,837 | B1 * | 7/2006 | Sherman et al. .............. | 455/415 |
| 7,103,345 | B1 * | 9/2006 | Lipsanen et al. .............. | 455/406 |
| 2002/0119786 | A1 | 8/2002 | Boehmke | |
| 2002/0126814 | A1 * | 9/2002 | Awada et al. ............ | 379/142.01 |
| 2004/0259531 | A1 | 12/2004 | Wood et al. | |
| 2005/0047561 | A1 * | 3/2005 | Seiferth ..................... | 379/88.22 |
| 2005/0091219 | A1 | 4/2005 | Karachale et al. | |
| 2005/0201533 | A1 * | 9/2005 | Emam et al. ................ | 379/88.19 |
| 2005/0287983 | A1 * | 12/2005 | Armanino et al. ............ | 455/405 |
| 2006/0068762 | A1 | 3/2006 | Baldwin et al. | |
| 2006/0099972 | A1 | 5/2006 | Nair et al. | |
| 2006/0178135 | A1 * | 8/2006 | Jiang et al. ................ | 455/414.1 |
| 2006/0234736 | A1 | 10/2006 | Lazaro et al. | |
| 2006/0258334 | A1 | 11/2006 | Tarallo | |
| 2007/0004396 | A1 * | 1/2007 | Connelly ...................... | 455/423 |
| 2007/0173233 | A1 * | 7/2007 | Vander Veen et al. ........ | 455/413 |
| 2008/0032687 | A1 * | 2/2008 | Mathewson et al. .......... | 455/423 |

OTHER PUBLICATIONS

International Search Report dated Jun. 26, 2008 for PCT Application Serial No. PCT/US08/58722, 9 pages.
Office Action dated Mar. 17, 2011 for U.S. Appl. No. 12/238,400, 17 Pages.
Office Action dated Oct. 6, 2010 for U.S. Appl. No. 12/238,400, 30 Pages.

* cited by examiner

*Primary Examiner* — Daniel Lai
(74) *Attorney, Agent, or Firm* — Amin, Turocy & Watson, LLP

(57) ABSTRACT

Providing for detection of a missed mobile paging event and storing data associated with an initiating mobile device as a result of such event is described herein. Components can include a gateway routing component that can receive a request to establish a mobile communication and initiate procedures to connect a target mobile device, and a data storage component that can store information related to an initiating mobile device if the target mobile device cannot be paged or is otherwise determined unavailable by the gateway routing component. Additionally, a contact component can provide a plurality of options related to the initiating mobile device to a target subscriber. Such a system can enable a mobile device user to access information related to initiating mobile devices, even if caller ID information is unavailable.

20 Claims, 10 Drawing Sheets

CALLER INFORMATION RETRIEVAL SYSTEM FOR UNAVAILABLE CALLS

BACKGROUND

Modern communication devices typically have mechanisms for identifying participants associated with an end-to-end telephone communication. Communication networks often relay information, such as a phone number and a subscriber name, associated with a telephone call. Systems such as caller ID can provide such information to an intended recipient of a telephone call. Benefits of providing call ID information are numerous; ID information can enable screening of incoming calls, identification of incoming calls that were missed, provide telephone numbers with which to return an incoming call, and enable management and storage of telephone numbers of incoming calls.

Mobile communication networks also typically relay caller identification information related to mobile voice communication. For example, when a telephone call directed at a mobile device is connected to that device, a telephone number and name information associated with the caller can be displayed at the mobile device. If the mobile device user is unavailable or uninterested in connecting the call at a particular time, a call can be returned utilizing the caller phone number and identification information. Additionally, such information can be useful to assist in responding to voicemail or answering machine messages that do not include a caller's phone number. Because of the substantial utility associated with caller identification information, a desire exists to provide such information when a network is unable to make an end-to-end connection. Typically, when a device is turned off or otherwise unable to be located by a network attempting to form a connection, the network cannot relay caller ID information. In such case, a target device subscriber may be an intended recipient of a communication, but have no means of returning a call or even of knowing that such an event took place.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The claimed subject matter provides for detecting a missed mobile paging event and storing data associated with an initiating mobile device. Components can include a gateway routing component that can receive a request to establish a mobile communication and initiate procedures to connect a target mobile device, and a data storage component that can store information related to an initiating mobile device if the target mobile device cannot be paged or is otherwise determined unavailable by the gateway routing component. Additionally, a contact component can provide a plurality of options related to the initiating mobile device to a target subscriber. Such a system can enable a mobile device user to access information related to initiating mobile devices, even if caller ID information is unavailable. Moreover, a subscriber can be notified of and/or retrieve information related to an un-connectable mobile communication even if a target mobile device is turned off, outside sufficient network radio coverage, associated with an expired subscription, lost or misplaced, or the like.

In accord with further aspects of the claimed subject matter, information related to an initiating communication device can be stored and made available to a target device subscriber if the target device is unavailable to receive a remote voice communication. A gateway routing component can receive a request to establish voice communication with a target device associated with the gateway routing component. A data storage component can store information related to the initiating device if the target device cannot be found by the gateway routing component. Additionally, a notification component can send the information to the target device, or to an alternate device associated with a user profile. Such components can provide information associated with an un-connectable call across disparate communication network architectures, such as enterprise VoIP networks, circuit-switched mobile or landline networks, IP-based networks such as the Internet, etc. Additionally, information can be provided in accord with a user-defined profile, which indicates preferences associated with a particular subscriber.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
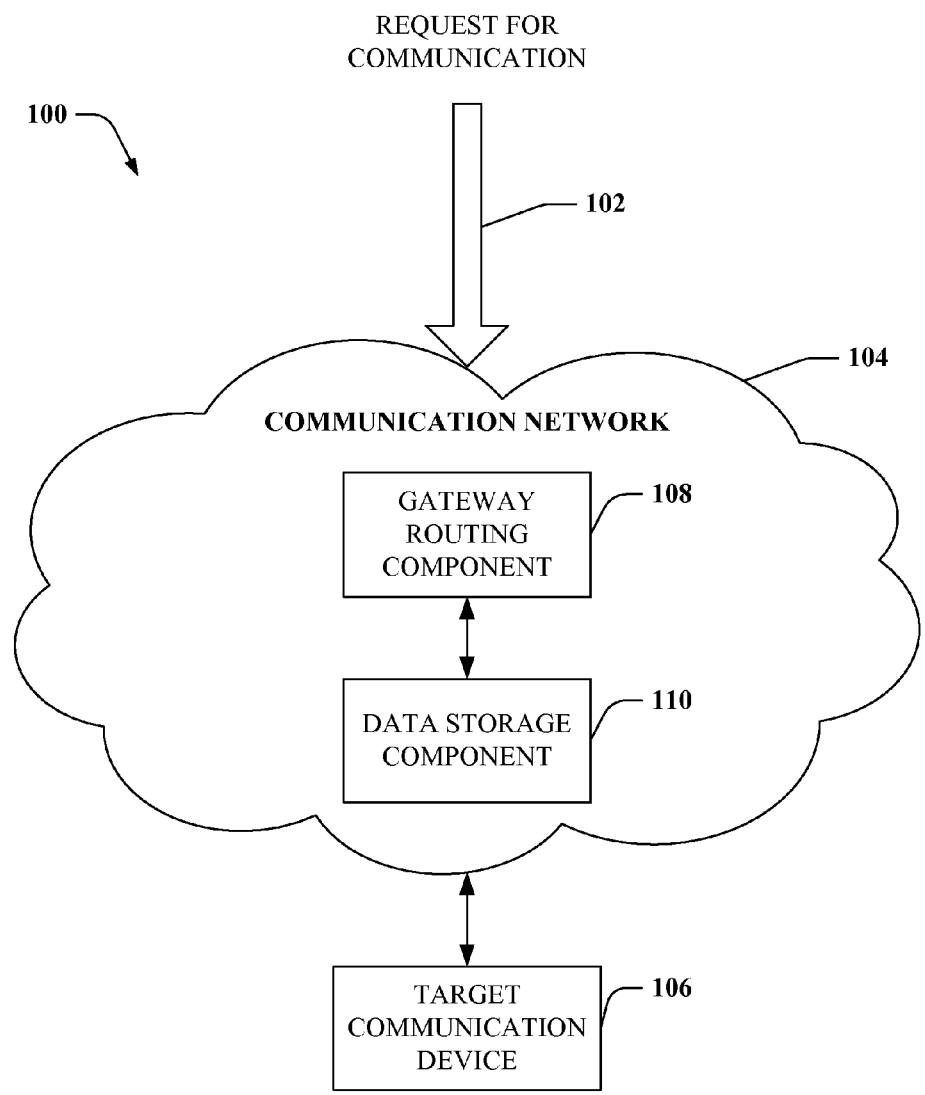
FIG. 1 illustrates an example system that stores identification information associated with a request for mobile communication in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 depicts an example system 100 that stores identification information associated with a request for communication 102 (e.g., remote network communication) in accord with aspects of the claimed subject matter. The request for communication 102 can be sent to a communication network 104 and contain information about an originating device and/or a target communication device 106. Such information can include, for example, a phone number associated with an originating device, name information associated with the originating device, a time associated with request for communication 102, and like information. Furthermore, request for communication 102 can be associated with voice communication, text communication, e-mail communication, a data exchange application (e.g., streaming video, streaming audio, etc.), or like device-to-device communication, or combinations thereof. Request for communication 102 can also include information associated with target communication device 106 (e.g., a phone number associated with such device). Such information associated with target communication device 106 can, for instance, assist in identifying, locating, and/or establishing an end-to-end information exchange with target communication device 106.

The following example is provided to establish context for system 100 as it relates to a particular end-to-end communication in the context of a mobile communication network and associated device(s). If, for example, mobile network 104 is a global system for mobile communication (GSM) network, request for mobile communication 102 can take the form of an integrated subscriber digital network (ISDN) user point (ISUP) protocol message, requesting communication via circuit-switched components of mobile network 104. An ISUP message is typically associated with a signaling system #7 (SS7) protocol and network to set up telephone calls in circuit-switched networks. Mobile network 104 can receive the ISUP message (e.g., at gateway routing component 108), and extract information related to target mobile device 106 from the message. Additionally, communication network 104 can attempt to locate target communication device 106 through components associated with communication network 104 and/or external, connected networks.

If information pertaining to a location of target communication device 106 is obtained, communication network 104 can attempt to have target communication device 106 paged by a telecommunication switch (e.g., mobile switching center (MSC) or the like). Typically, once a page reaches a telecommunication device (e.g., target communication device 106), caller ID information associated with request for communication 102 (e.g., including a phone number, name, time of call, etc.) can be provided. However, if communication network 104 fails to page target communication device 106 (e.g., target communication device 106 is powered off, misplaced or lost by a subscriber, in insufficient radio coverage for paging, or request for communication 102 is terminated prior to completion of paging, or like circumstance) caller ID information can fail to be delivered to target communication device 106. It should be appreciated that the foregoing example can be applied to similar circuit-switched, packet-switched, and/or combination circuit and packet switched communication networks. For instance, communication network 104 can include a code division multiple access (CDMA) network or a universal mobile telecommunication system (UMTS) network.

System 100 can store information related to request for communication 102 in the event that target communication device 106 cannot be contacted by communication network 104 (e.g., a network paging event fails to reach such device, the device is powered off and a call is routed directly to voice mail, etc.) Gateway routing component 108 can receive request for communication 102 and attempt to locate such device. If target communication device 106 cannot be located (e.g., such device is powered off, in insufficient radio coverage, etc.), data storage component 110 can save the information related to request for communication 102 (e.g., phone number, name information, time associated with a communication, or like information). Optionally, data storage component 110 can save information related to request for communication 102 when any such request is made, independent of a failure to contact a target device. Consequently, missed call information can be saved, for example, even if paging is successful and caller ID information is delivered to target communication device 106. This optional saving of information can be useful if, for instance, a subscriber misplaces a device that is powered-on and consequently answers a paging event and receives caller ID information. If such device is not recovered by the subscriber, an alternate method for accessing such data can be provided via data storage component 110.

Information related to a request for communication 102 can be retrieved from data storage component 110 through various communication mechanisms. For example, a predetermined website can display information related to a request for communication 102 related to a particular target device (106). Additionally, a subscriber can dial a toll free number to retrieve such information related to request for communication 102 as described herein. Furthermore, a retrieval number can be dialed, for instance, on a handset (106) connecting a user of such device to an interface that can provide information stored on data storage component 110 related to a particular device (106). Also, a call to customer care can provide such information, or a short message service (SMS) (e.g., instant message, text message, or the like) can be sent and/or received at target communication device 106 including such information or otherwise providing access or a means of accessing it. It should be appreciated that the listed retrieval mechanisms can be applicable to unavailable calls, as describe above in regard to system 100, or to unavailable calls in addition to otherwise completed calls (e.g., calls sent to voicemail or completed end-to-end communications). Such retrieval mechanisms can further delineate time associated with unavailable calls, and/or specify a number of hours and/or days that such information can be available for subsequent retrieval.

It should be appreciated that communication network 104 can include any suitable mobile and/or landline based circuit-switched communication network including a GSM network, a time division multiple access (TDMA) network, a CDMA network, such as IS-95 and subsequent iterations of CDMA technology, an integrated digital enhanced network (iDEN) network and a public switched transport network (PSTN). Further examples of communication network 104 can include any suitable data packet-switched or combination data packet/circuit-switched communication network, e.g., a wired or wireless internet protocol (IP) network such as a voice over internet protocol (VoIP) network, an IP data network, a universal mobile telecommunication system (UMTS) network, a general packet radio service (GPRS) network, and other communication networks that provide streaming data communication over IP and/or simultaneous voice and data communication over combination data packet/circuit-switched technologies.

An example of a target communication device 106 in accordance with system 100 can include a mobile phone, a PSTN phone, a cellular communication device, a cellular phone, a satellite communication device, a satellite phone, a VoIP phone, a WiFi phone, a dual-mode cellular/WiFi phone, a combination cellular/VoIP/WiFi/WiMAX phone or any suitable combination thereof. Specific examples of a target mobile device can include cellular devices such as GSM, TDMA, CDMA, IS-95 and iDEN phones and cellular/WiFi devices such as dual-mode GSM, TDMA, IS-95 or iDEN/VoIP phones, UMTS phones UMTS VoIP phones, or like devices or combinations thereof. In addition, gateway routing component 108 can include any suitable component that can perform centralized routing within a mobile, satellite, or similar network (but optionally does not include components that route strictly within a PSTN network), routing between communication networks, between networks of varying architecture (e.g., between PSTN, GSM, UMTS, Enterprise VoIP, the Internet, or combinations thereof), or the like. Specific examples of gateway routing component 108 can include a GMSC, a gateway GPRS support node (GGSN), a session border control (SBC) device, or like devices. Additionally, data storage component 110 can include any suitable device, process, combination device and process, etc., that can store digital and/or switched information (e.g., server, database, data store, or the like).

Figure 2:
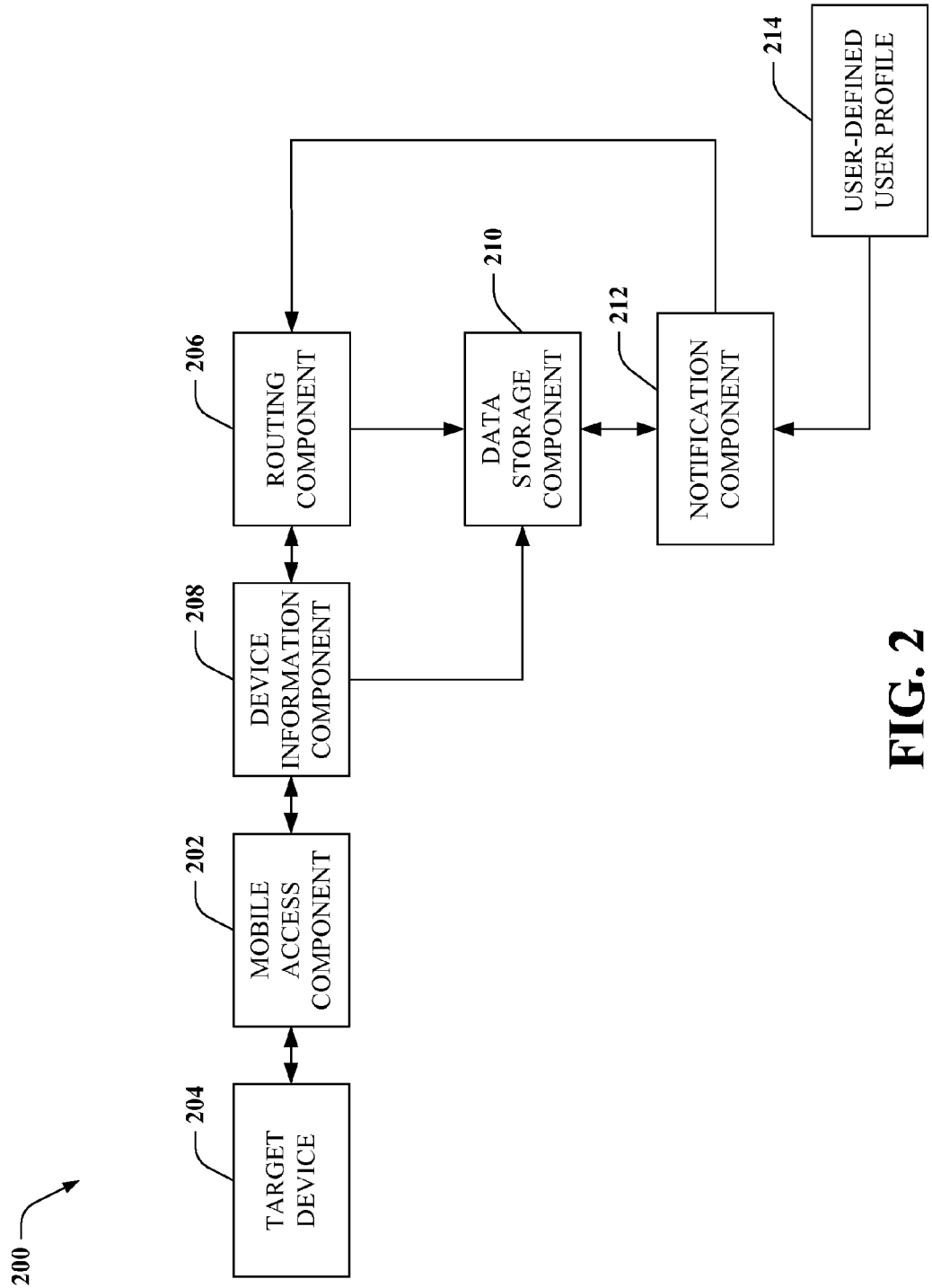
FIG. 2 depicts an exemplary system that receives a voice communication request and can store information related to such request if a target device cannot be found in accordance with aspects disclosed herein.

FIG. 2 depicts a system 200 that can store information related to an unavailable voice communication in a mobile communication network in accord with aspects of the claimed subject matter. The unavailable communication can result, for instance, from a failure of a mobile access component 202 to page a target device 204, from routing component 206 transferring a call directly to voice mail (e.g., as can typically occur when a target mobile device 204 is powered off). For example, if target device 204 is powered off, an originating device cancels (e.g., hangs up) a request before call routing and/or setup can complete, target device 204 is in insufficient radio coverage to receive the page, or like circumstance, and a paging event will be unsuccessful. Target device 204 can include, for instance, a mobile communication device, a VoIP device, a computing device that can form a communication link with a mobile access network, or like devices. Mobile access component 202 can include, for instance, an MSC, a Node B associated with a UMTS network, a WiFi or WiMAX router associated with a fixed access IP network, or similar mobile and/or IP-based network access controllers and/or network access points.

Routing component 206 can receive a request to establish a communication with target device 204. Routing component 206 can be a gateway device that can enable centralized routing within a network, or communication between different operator's networks and networks of different architectures (e.g., circuit-switched network to packet-switched network and vice versa, GSM network to CDMA, TDMA, or similar network, GSM, UMTS, GPRS network to the Internet, etc.) The request to establish communication can utilize, for instance, an American national institute of standards (ANSI)-41 message, an ISUP message, or similar communication network protocol appropriate for a mobile communication network as described herein (e.g., explained in more detail at mobile network 104 of FIG. 1). Additionally, such request can contain information related to an originating device (not shown), and related to target device 204. Specifically, information related to target device 204 can include routing information (e.g., telephone number associated with target device 204) that can be used to locate a network component in radio contact with such device (e.g., mobile access component 202).

Routing component 206 can initiate procedures for locating target device 204 via device information component 208, for instance. If a device is located, routing component 206 can additionally receive routing information associated with such device (204) and a switching center (202) associated therewith, in order to establish a communication channel therewith (e.g., ISUP trunk between two switching centers, routing information for packet-switched routing devices, etc.) If such device cannot be located, then routing component can forward the failure to locate target device 204 to data storage component 210 for further handling.

Device information component 208 can store data related to target device 204. Such data can include, for example, telephone number data, routing data, location data of a serving mobile access component (202) (e.g., a serving MSC), or like data. Device information component 208 can further receive information related to a request to establish communication with target device 204 from routing component 206. Further, a message (e.g., mobile application part (MAP) protocol message related to location management, authentication, and call handling services) can be sent to mobile access component 202 serving target device 204 to indicate that a request for mobile communication has been received from routing component 206. Such a message can request a roaming number or similar routing information associated with mobile access component 202 and/or target device 204. If a roaming number is received, device information component 208 can provide such roaming number to routing component 206. However, if such information is not received from a mobile access component (202), device information component can report a failure to locate target device 204 (e.g., a failure to respond to a paging message sent by mobile access component 202) to routing component 206 as well.

In accord with further aspects disclosed herein, system 200 can store information related to a request to form a communication, if such request cannot be filled due to unavailability of a target device 204. Data storage component 210 can receive an indication from routing component 206 that target device 204 had been unavailable for a particular communication request. Furthermore, data storage component 210 can receive and retain data related to an originating device, for instance, a telephone number, name data, time associated with a communication request, or similar data. Data received from routing component 206 can be retained at data storage component 210 in the event that a device (204) cannot respond to a paging message, and consequently cannot be provided caller ID information related to the communication request. In such a manner, data storage component 210 can retain data related to incoming calls associated with an unavailable target device 204. Consequently, a subscriber can access missed call information even when caller ID information cannot successfully be delivered (e.g., when a phone is powered off, in insufficient radio coverage to respond to a paging-type event, etc.)

Optionally, data related to a communication request can be provided to and retained at data storage component 210 even if paging was successful. Storing data when paging is successful can be useful for a lost or misplaced target device (204). Specifically, if a misplaced target device (204) was powered on, responded to a paging event and therefore received caller ID information, but remained unfound by an associated subscriber, the subscriber could be unable to access such information or even know that a call had been missed. Consequently, if data storage component 210 retains communication request data even when a network can locate target device 204 (e.g., target device 204 responds to a paging event) the subscriber could still identify incoming calls and associated data related to a lost or misplaced device (204).

According to additional aspects, system 200 can provide information related to incoming communication requests for unavailable devices in accord with user specified criteria. Notification component 212 can receive an indication that a call was missed due to unavailability of target device 204. Furthermore, notification component 212 can access information related to an originating device retained at data storage component 210 (e.g., phone number, name data, time data, etc.) Notification component 212 can attempt to provide target device 204 with such information via routing component 206. For example, notification component can request routing component 206 (e.g., or similar network component) for indication when target device 204 is next able to log onto a communication network. If such indication occurs, notification component 212 can forward the information related to an originating device via routing component 206 to target device 204. Alternatively or additionally, notification component 212 can forward such information to a subscriber via some other mechanism specified within a user-defined user profile 214.

System 200 can include a user-defined user profile 214 (e.g., stored within a network component, such as data storage component 210, stored on a target device 204, or component external to a communication network or target device, or combinations thereof) that specifies criteria for contacting a subscriber. Information forwarded by routing component 206 and/or notification component 212 related to missed communication (e.g., as a result of unavailability of target device 204) can be in accord with such criteria. For example, a subscriber can specify an e-mail address, alternate phone number, instant messaging address, phone number of target device 204, web-page, or similar mechanism by which information related to missed calls or unavailable communication can be provided. Consequently, system 200 can provide such information in a manner most useful to a particular subscriber.

Figure 3:
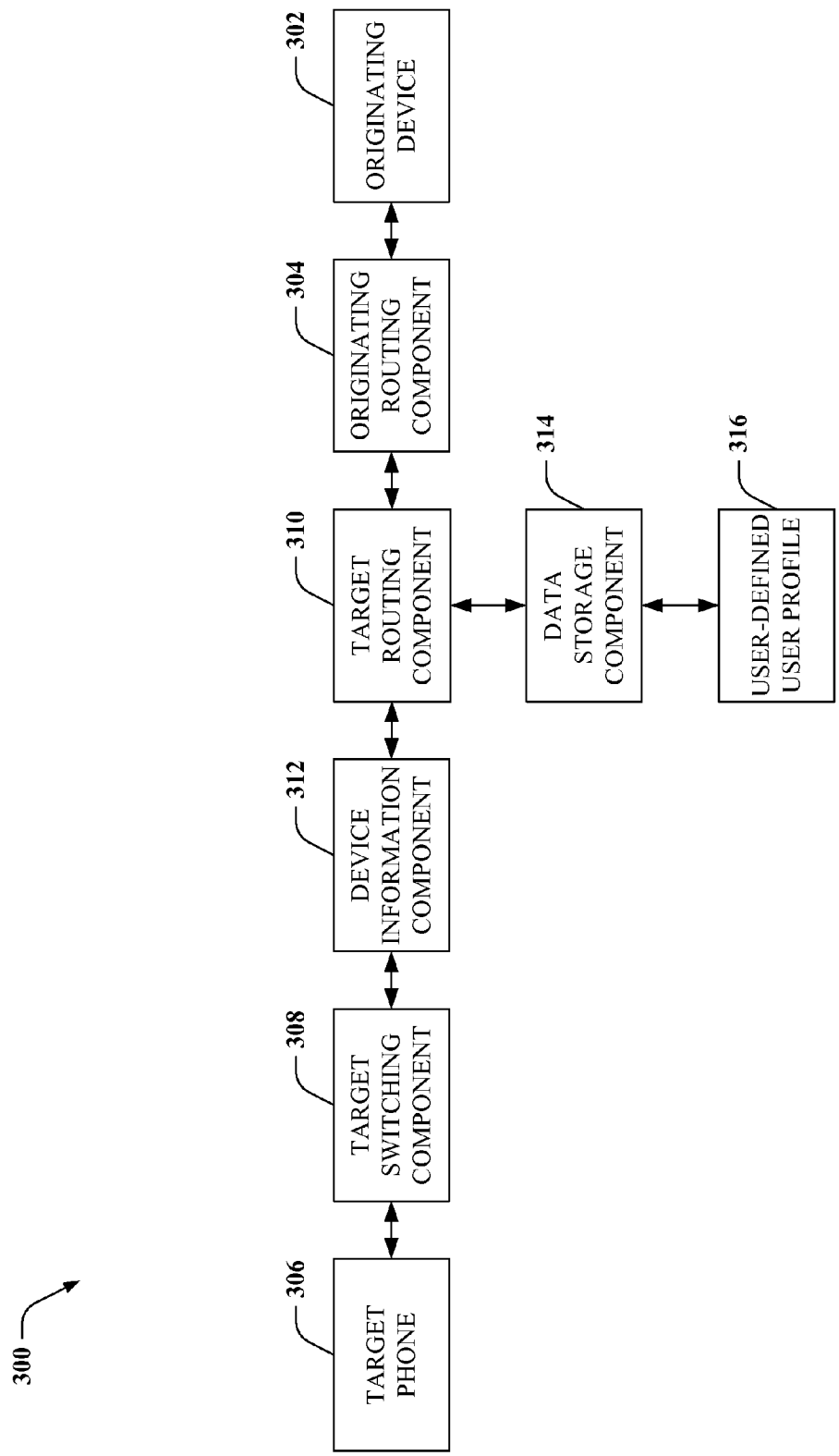
FIG. 3 illustrates an example system for storing data related to a missed mobile communication in accord with aspects of the subject innovation.

FIG. 3 illustrates an exemplary system 300 for storing data related to unavailable communication for circuit-switched networks in accord with aspects of the claimed subject matter. Such networks can include, for example, GSM, CDMA, TDMA, and similar mobile communication networks, as well as PSTN landline networks. Originating device 302 can access a routing component (e.g., originating routing component 304) associated therewith and request a dedicated communication channel be formed with a target phone 304. Both originating device 302 and target phone 306 can be circuit-switched communication devices, for instance, GSM, CDMA, TDMA, and/or PSTN communication devices and similar devices. Such request initiated at originating device 302 can be via any suitable signaling and/or setup protocol associated with such networks and devices, for instance, an ISUP request to establish an ISUP trunk (e.g., between an originating switching component (not shown) and a target switching component 308 serving target phone 306).

Originating routing device 304 can receive a request to establish communication from originating device 306, and determine a gateway routing device (310) associated with target device 304. Such determination can be made by way of standard location-based techniques, such as referencing a local number portability (LNP) call database (not shown). After locating target routing component 310, originating routing device 304 can forward the communication request to target routing component 310, which can include, e.g., a GMSC or similar device associated with target phone 306. Target routing component 310 can then reference a device information component 312 to obtain a switching component (e.g., target switching component 314) associated with target phone 304. Target switching component 314 can include, for example, a MSC associated with target phone 304, or similar switching device. Target switching component 314 can forward a paging request to target phone 304. The paging request can, for example, notify target phone 304 of a requested communication and establish radio protocols for joining a dedicated communication trunk (e.g., ISUP trunk or similar dedicated time or code division voice communication channel) for end-to-end voice communication.

If target phone 304 fails to respond to a paging request, target switching component 314 can forward such failure to target routing component 310. Target routing component can make a determination that target phone 304 is unavailable for communication, and direct data storage component 314 to store information related to originating device 302. Such information can include, e.g., phone number and/or subscriber name associated with originating device 302, a time and date of request, or similar information. Information related to an unavailable call can be referenced by a subscriber associated with target phone 304 and indicate an occurrence of an intended call that such subscriber could otherwise have been unaware of. For example, a subscriber can access data storage component 314 through a phone number (e.g., toll free number, or *611 mobile customer service number etc.), interaction with customer care associated with a network service provider (not shown), a webpage, via e-mail, via instant messaging, or like mechanisms.

In accord with additional aspects, information related to an unavailable call can be accessed in accord with a user-defined user profile 316. User-defined user profile 316 can be stored within target phone 306, within a network component (e.g., data storage component 314), within a network component external the target phone and a communication network, or combinations thereof. Such profile (316) can specify preferences for providing access to information stored at data storage component 314 (e.g., related to unavailable incoming calls or the like). In such a manner, system 300 can provide information related to calls that could not be connected to target phone 304 in a manner most convenient to a phone subscriber.

Figure 4:
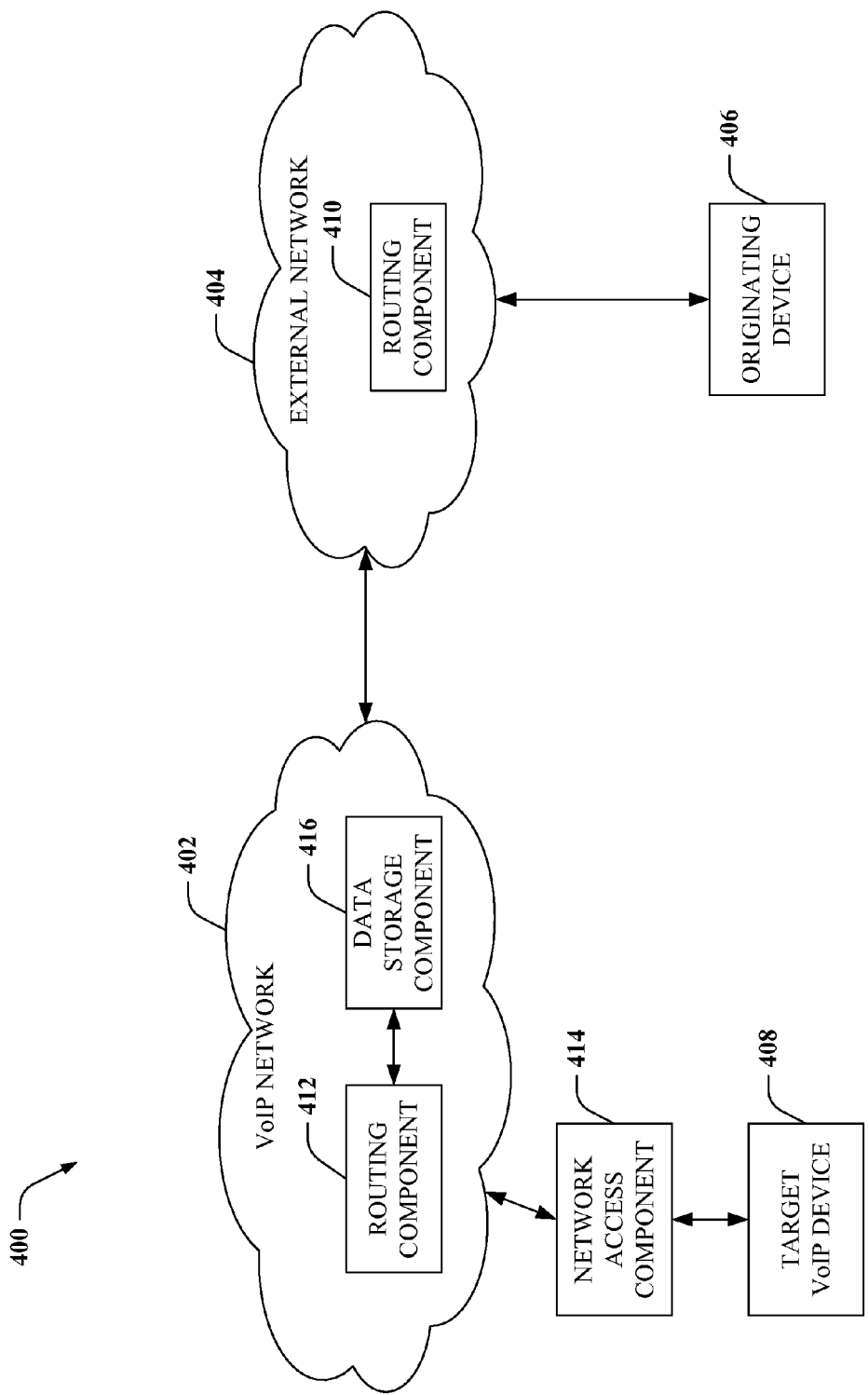
FIG. 4 depicts an example system for storing data related to a missed voice over Internet protocol (VoIP) communication according to aspects disclosed herein.

FIG. 4 depicts an exemplary system 400 for storing data related to unavailable communication for packet-switched IP networks in accord with aspects of the claimed subject matter. VoIP network 402 can include any suitable packet-switched communication network providing access via wired and/or wireless IP communication, and providing at least VoIP data communication. Examples of mobile IP network can include a UMTS network, a GPRS network, an enterprise VoIP network, such as a local or wide area network (L/WAN) providing for VoIP communication, or like IP-based communication networks. External network 404 can include any suitable voice and/or data communication network, including circuit-switched mobile networks (e.g., GSM, CDMA, TDMA, and like mobile networks), circuit-switched landline networks (e.g., PSTN), a VoIP network substantially similar to VoIP network 402, the Internet, and the like.

System 400 can provide for end-to-end communication, including voice and/or data communication, between an originating device 406 and a target VoIP device 408. Originating device 406 can send a request to communicate with target VoIP device 408 to a routing component 410 associated with external network 404, serving originating device 406. Routing component 410 can receive such a request and initiate signaling/setup protocols (e.g., ISUP to VoIP, or similar) between external network 404 and VoIP network 402. Such signaling/setup protocols can identify a routing component 412 associated with target VoIP device 408 (e.g., utilizing LNP location techniques), and forward the request for communication to such device. Routing component 412 can attempt to locate a network access component 414 (e.g., Node B and/or serving GPRS support node (SGSN) device associated with a UMTS network, LAN/WLAN routing device, etc.) serving target VoIP device 408. Once such network access component 414 is identified, routing component 412 can attempt to connect the end-to-end call between originating device 406 and target VoIP device 408. However, should such connection fail (e.g., if target VoIP device 408 is powered off, subject to insufficient logical communication with network access component 414, service subscription is expired/unavailable, etc.) routing component 412 can make a determination that target VoIP device 408 is unavailable for communication at a particular time.

Routing component 412 can direct a data storage component 416 to retain data related to originating device 406 in the event that target VoIP device 408 is determined to be unavailable for a particular communication. Data storage component 416 can retain such data in a manner substantially similar to that outlined supra. Additionally, data storage component 416 can notify target VoIP device 408 of the unavailable communication if such device subsequently logs onto VoIP network 402 and/or forms a communication with network access component 414. A subscriber associated with target VoIP device 408 can access information retained at data storage component 416 related to such communication, to identify originating devices (406) associated with an unavailable and/or failed communication. By such mechanisms, system 400 can notify a device of an unavailable call and provide information associated with an originating device (406), even when standard caller ID messaging is not provided.

Figure 5:
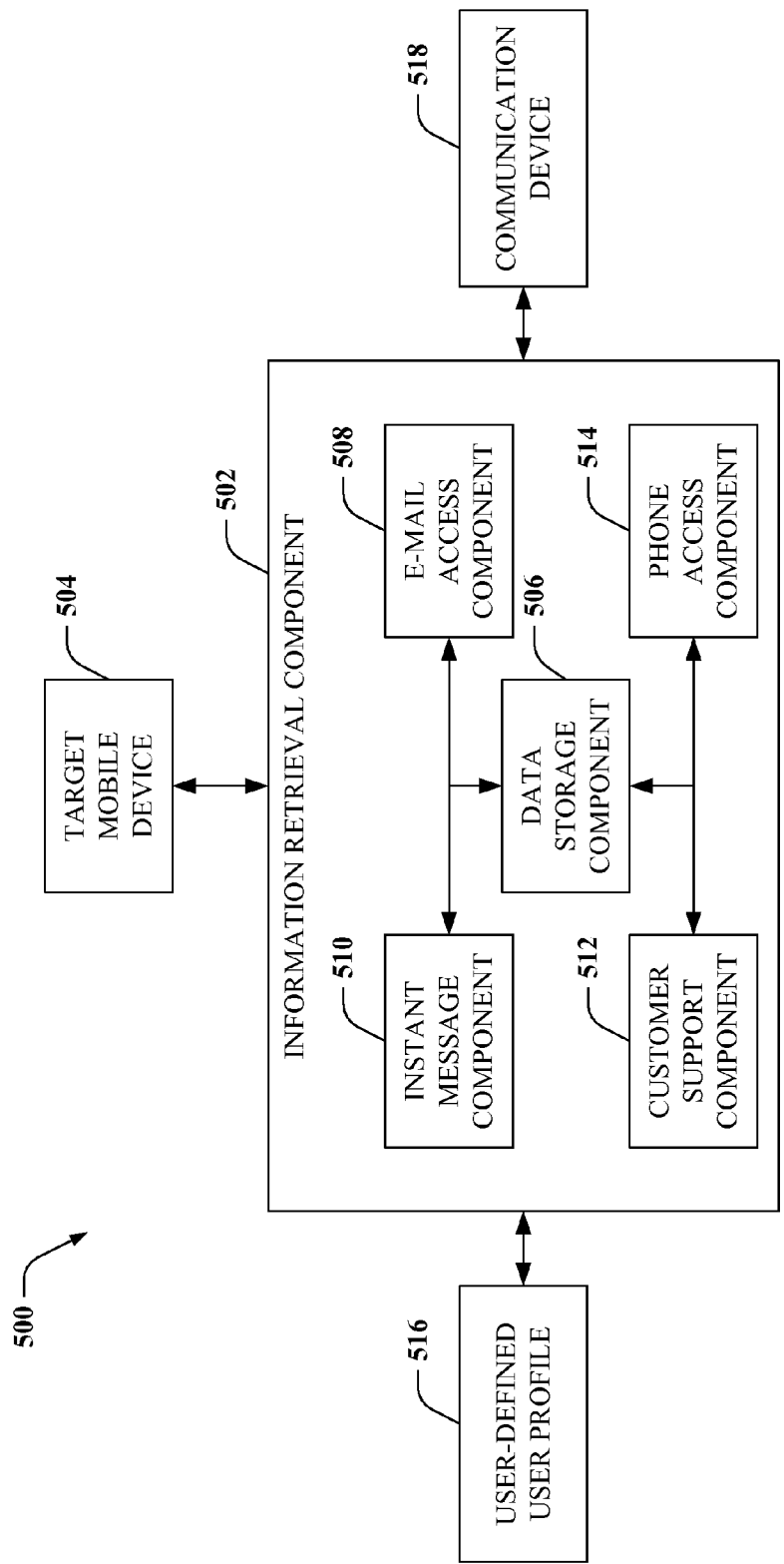
FIG. 5 illustrates a sample system that provides information related to a missed call to a target subscriber in accord with aspects of the claimed subject matter.

FIG. 5 depicts a sample system 500 for providing information and/or access to information associated with unavailable communication in accord with aspects disclosed herein. Information retrieval component 502 can be associated with a communication network and receive an indication of a failure to connect communication devices (e.g., via failed paging message, insufficient radio or logical connection with a target device 504 to support communication, etc.), and failure to provide caller ID information to target device 504. Furthermore, when such indication occurs, information retrieval component can receive information related to an originating device and store such information at data store component 506. Data storage component can retain a phone number, name information, time of call information, and similar information associated with the originating device. Additionally, information retrieval component can include various access mechanisms for a subscriber associated with target mobile device 504 to access information retained at data storage component 506.

Information retrieval component 502 can include an e-mail access component 508, instant message component 510, customer support component 512, and phone access component 514. E-mail access component 508 can provide an e-mail message to a subscriber that indicates information stored as a result of an unavailable communication. The e-mail message can be sent as a result of a query by a subscriber to information retrieval component 502, or automatically in accord with a user-defined user profile 516. The user-defined user profile can specify, for example, an e-mail address, instant message address, phone number, or other contact information with which information retrieval component 502 and/or associated components can automatically indicate that a call failure has occurred.

Instant message component 510 can relay information to a target mobile device 504 or another communication device 518 in response to a query by a subscriber, or automatically in accord with a user-defined user profile 516. Customer support component 512 can further be accessed by target mobile device 504 for information related to a failed or unavailable communication. Such component can include personnel, or equipment, or the like associated with a network service provider, that can notify, update, and/or respond to a query from a subscriber of information related to an unavailable call. Additionally, a phone access component 514 can provide access to a recording of information related to an originating device and a failed communication. As described, system 500 can facilitate providing information and/or access to information related to unavailable calls and/or unanswered calls in accord with aspects of the subject innovation.

Figure 6:
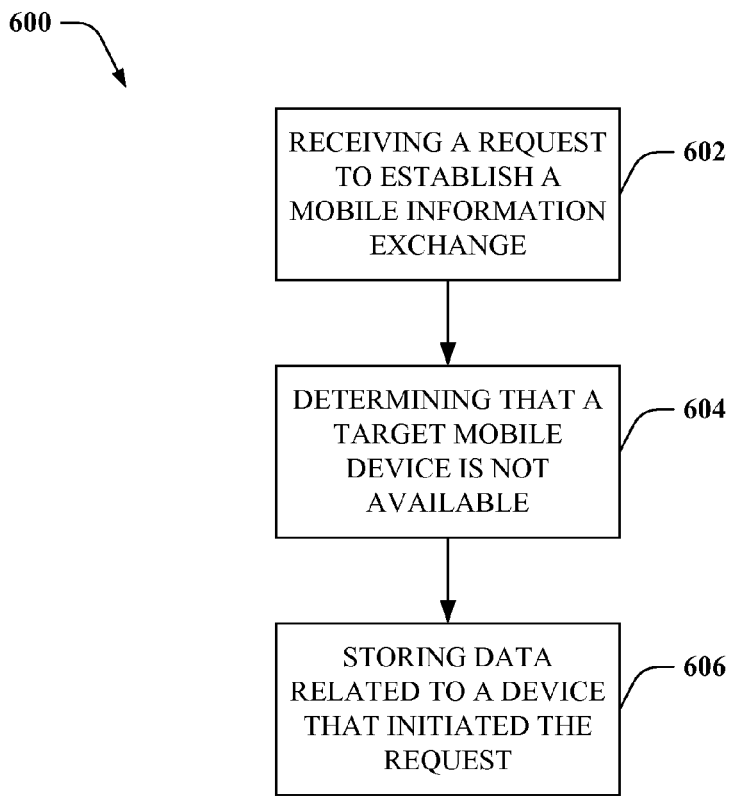
FIG. 6 depicts a sample high-level methodology for storing information related to a missed mobile communication in accord with aspects disclosed herein.
Figure 7:
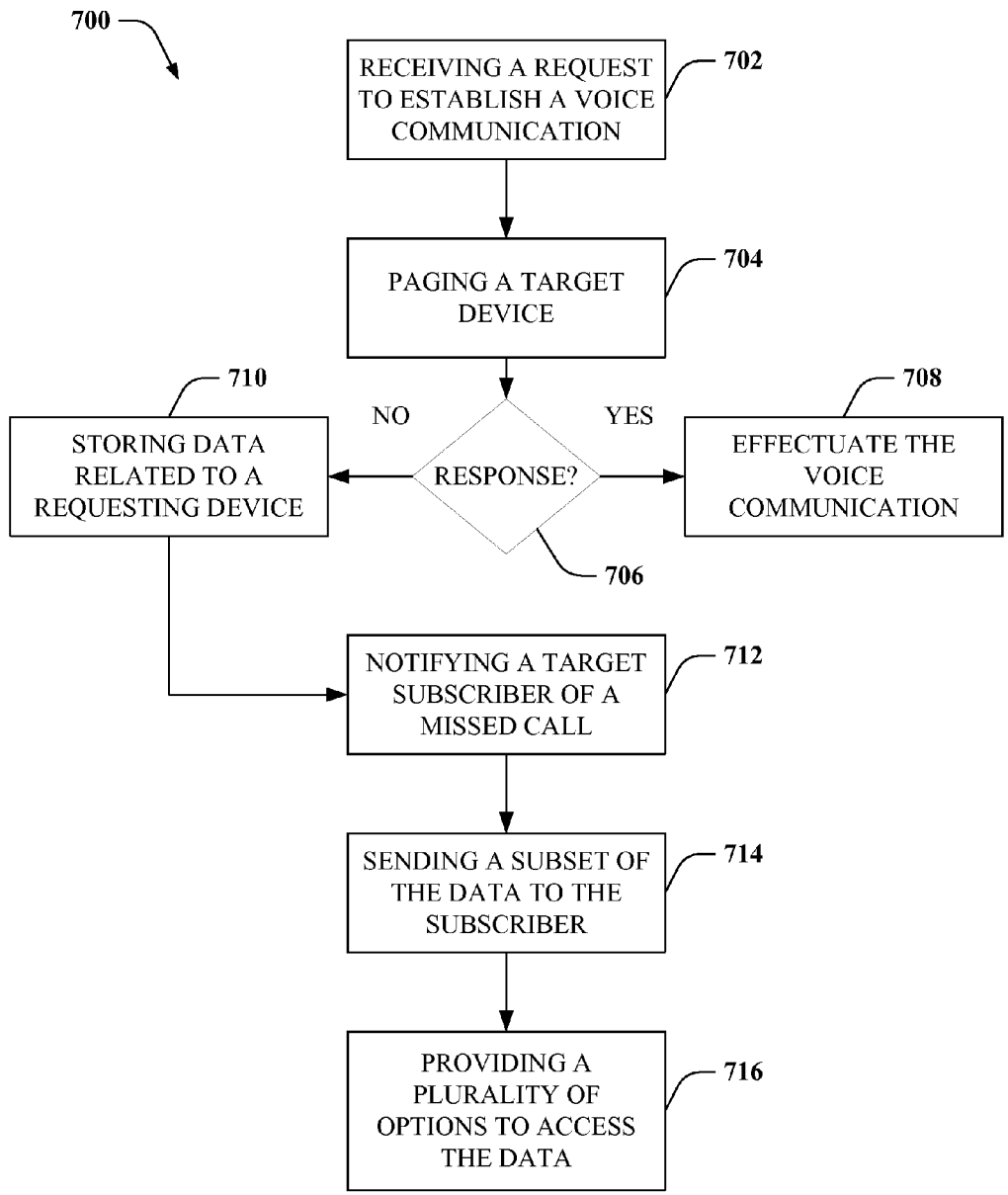
FIG. 7 illustrates a sample methodology for storing and providing information related to a missed remote voice communication in accord with aspects of the claimed subject matter.
Figure 8:
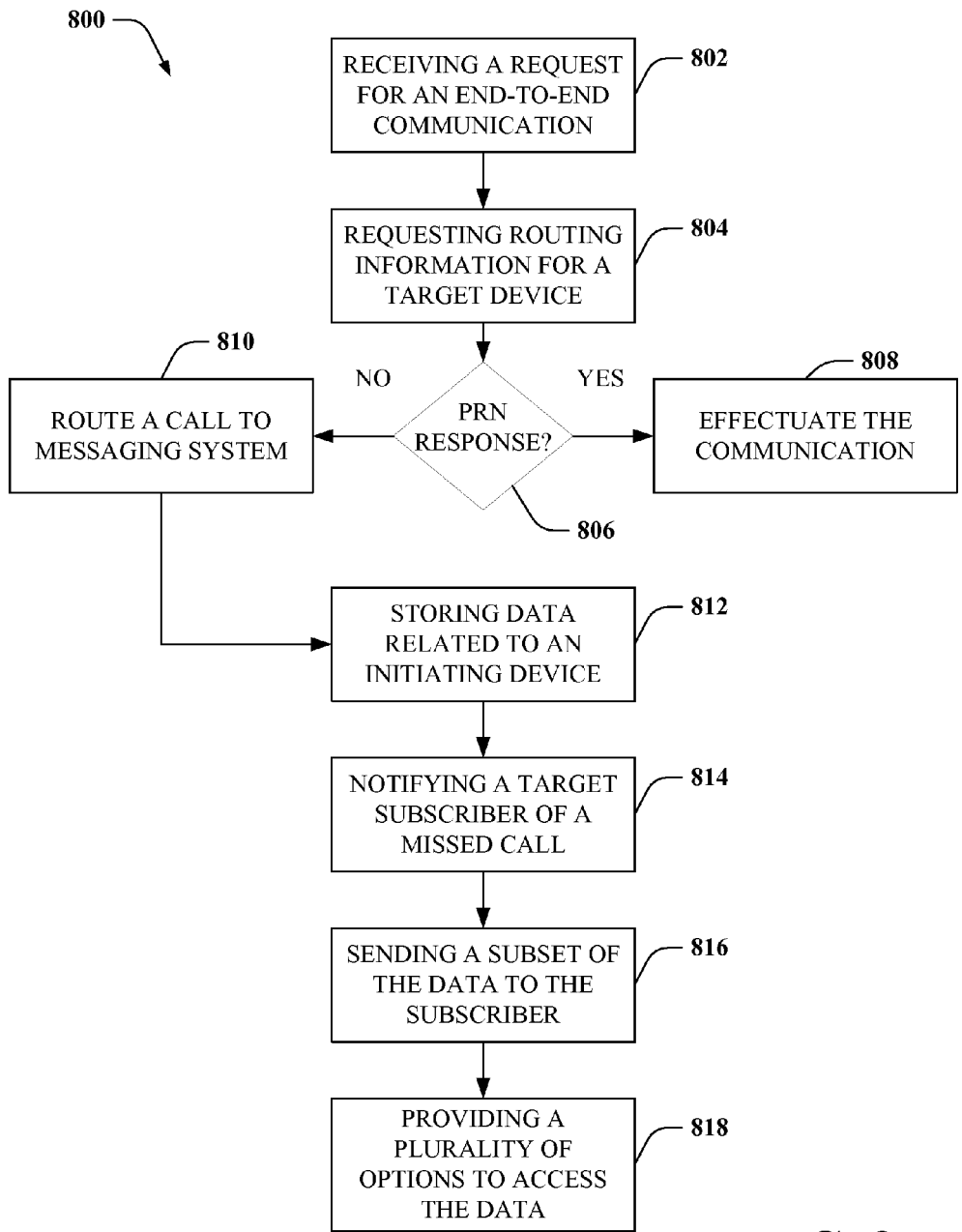
FIG. 8 illustrates a sample operating environment that can determine and store information related to a missed call in accord with aspects of the claimed subject matter.

FIGS. 6, 7 and 8 depict example methodologies in accord with the claimed subject matter. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 6 illustrates an example methodology for storing and providing information related to a mobile communication in accord with aspects disclosed herein. At 602, a request is received to establish a mobile information exchange. Such request can be from an originating communication device (e.g., mobile phone, circuit-switched phone, packet-switched communication device, VoIP device, etc.) as described herein, utilizing, for example, standardized setup and/or signaling protocols for forming communication between two or more devices. The request can be received at a network gateway component associated with a voice or voice and data communication network as described supra. Furthermore, the network gateway component can initiate typical communication procedures for extracting information from the request related to routing between an originating devices and a target device.

At 604, a determination is made that a target mobile device is not available. Such determination can result from a failed paging event, for instance. Typically, a paging event can occur between a switching device (e.g., MSC, or like device) or other network access point/control point responsible for managing initial point communication with a target mobile device. The paging event can inform a target mobile device that an intended call is incoming, and specify information related to establishing a trunk, or packet switched routing information, etc. associated with end-to-end communication. A failed paging event can occur when a device is powered off, in insufficient radio coverage to maintain a communication link with an access point, when a request is terminated (e.g., originating device hangs up) prior to completion of a paging message, or similar occurrence. If a communication network cannot maintain communication with the target mobile device, the determination at reference number 604, that such device is unavailable, can be made.

At 606, data is stored related to a device that initiated the request. For example, data can include a phone number associated with the initiating device, name information associated with such device, time associated with the request, and like information. Such data can be stored on a component of a communication network, a component of an originating device, components external to both the network and device, or combinations thereof. Furthermore, such information can be made available and/or sent to a subscriber to inform the subscriber that a call was attempted but failed. Such information can be especially valuable when no communication could be effectuated between an intervening network and the target mobile device, and thus caller ID information could not have been submitted to the target device. Consequently, methodology 600 provides an alternative mechanism for retrieving call information, which can be effective for any intended call that reaches a network routing component.

FIG. 7 illustrates a sample methodology for establishing a robust caller information system in accord with aspects of the subject disclosure. At 702, a request is received to establish a voice communication. Such voice communication can be an end-to-end communication between two or more communication devices. Additionally, such communication can be effectuated via a circuit-switched components (e.g., GSM, CDMA, TDMA, or similar mobile networks, or PSTN landline networks) or packet-switched IP-based components (e.g., UMTS, GPRS, networks, enterprise VoIP networks, IP-data networks, the Internet, private IP intranets, and the like), or combination circuit-switched and packet-switched communication network (e.g., some advanced second generation (2.5G), including GSM and GPRS networks, that can utilized both circuit switched and packet switched communication), or combinations thereof.

At 704, a target device is paged. Such paging can include a message from an access point and/or access controller serving a mobile device indicating that a request for communication has been established. Additionally, such paging event can specify or lead to specification of communication protocols to effectuate the communication. At 706, a determination is made as to whether a response to the page is received. If so, methodology 700 proceeds to 708 where the voice communication can be effectuated. Upon such event, methodology 700 terminates. If the determination indicates that no response to the page was received, then methodology proceeds to 710 where data is stored related to the requesting device. Such data can include a telephone number, name information, time information associated with a request, and/or like information related to a requesting device.

At 712, a target subscriber is notified of a missed call. Such notification can further be in accord with a user profile, indicating a preferred mode of notification (e.g., e-mail, IM, phone call, etc.). At 714, at least a subset of the data stored at reference number 710 is sent to the subscriber. Data can be sent, for example, to the target mobile device, to an alternate communication device specified in a user profile, or a hard-copy report sent via mail, or combinations of these or like mechanisms. At 716, a plurality of options is provided for accessing the data. The options can include an e-mail option, a web-page option, a toll-free phone option, a customer support contact option, an instant message option, or similar options. As described, methodology 700 provides for call notification and information retrieval that can be effective in circumstances where typical caller ID systems are not.

FIG. 8 illustrates an example methodology for providing missed call information in accord with additional aspects of the claimed subject matter. At 802, a request is received for an end-to-end communication. The communication can be related to voice communication, data communication, such as instant messaging, streaming video, file sharing, picture sharing, e-mail, concurrent audio, or like data communication services, or a combination of both. Additionally, any suitable communication device, such as a mobile device, landline device (e.g., PSTN phone, etc.), VoIP device, computer, laptop, personal digital assistant (PDA), gaming device, or like device or combinations thereof, can initiate the request for end-to-end communication. The request can also contain information associated with an initiating device and a target device (e.g., phone number, caller ID information such as subscriber name associated with an initiating device, date and/or time of call, and the like). Such information can be utilized by a communication network in locating radio access network (RAN) components, microwave access components, logical connection (e.g., Ethernet, etc.) components etc. in communication with the target device, and establishing an end-to-end communication between at least the initiating and target devices.

At 804, routing information associated with a target device is requested. The routing information can include, for example, a routing address of a network access component (e.g., MSC, SGSN, WiFi router, WiMAX router or like network access device) in communication with a target device. The routing information can be received via any suitable communication transfer protocol (e.g., a provide roaming number (PRN) instruction associated with Customized Applications for Mobile networks Enhanced Logic (CAMEL) standards for providing network communication services) associated with call signaling/setup operations and/or service definition and activation. At 806, a determination is made as to whether requested routing information is received. Such response can be, for instance, a PRN message that can identify a network control component or like device in contact with the target device. If such routing information is received as a result of the request at reference number 804, methodology 800 proceeds to 808 where the communication is effectuated. If no response is received (e.g., if a device is powered-off, or otherwise unable to contact network components), methodology 800 instead proceeds to 810.

At 810, a call related to the request at reference number 802 is routed to a messaging system. Such messaging system can include, for example, voice mail, text mail, e-mail, or similar messaging systems. At 812, data related to an initiating device is stored. Such data can include, for instance, a phone number, subscriber name, time and date of call, or the like associated with a device initiating the request received at reference number 802. At 814, a target subscriber can be notified of a missed call. Such notification can result via instant message service, e-mail, a return call to the target device, a return call to an alternate phone number, a web-page update, or similar mechanism. In addition, such notification can be in accord with a user-profile established by a subscriber associated with such device. At 816, at 1 east a subset of the data stored at reference number 812 can be sent to the subscriber. At 818, a plurality of options for accessing the data can be provided. Such plurality of options can include, for instance, a website that can display information associated with inbound calls related to a target device, a toll free number, a feature call from the target device handset, a call to customer care associated with a service provider, an SMS to a network and/or service provider, or like mechanism. Furthermore, the plurality of options can indicate a number of hours and/or days left for retrieval of stored data. As described, methodology 800 provides for notification and retrieval of inbound call-related information if network components are unable to identify routing information necessary to effectuate an end-to-end communication with a target mobile device.

Figure 9:
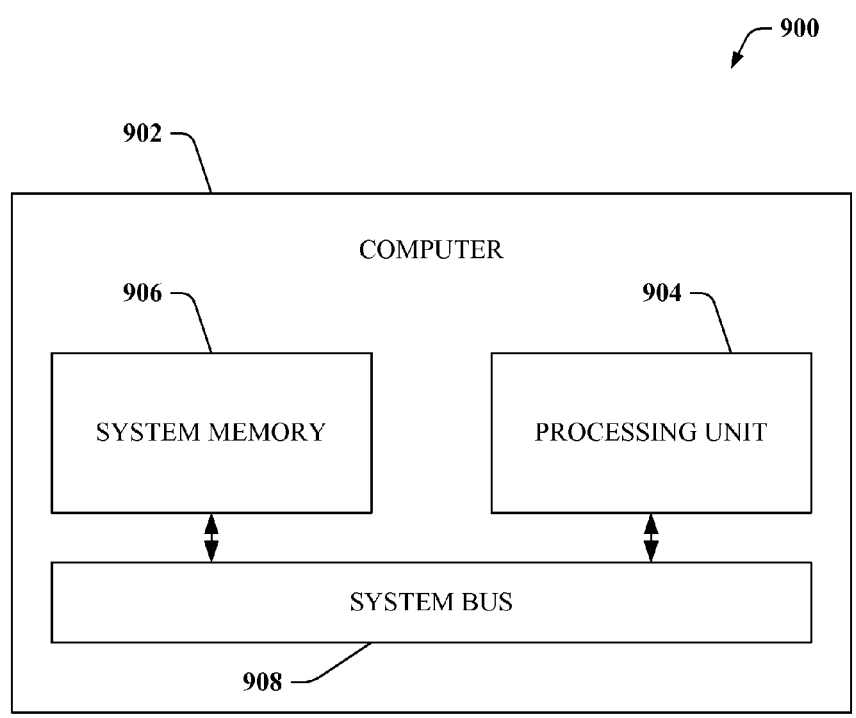
FIG. 9 depicts a sample network-environment for effectuating mobile communication in accord with aspects of the subject innovation.

In order to provide additional context for various aspects of the claimed subject matter, FIG. 9 and the following discussion are intended to provide a brief, general description of a suitable computing environment 900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors, such a single core processor, a multi-core processor, or any other suitable arrangement of processors. The system bus 908 can be any of several types of bus structure that can further interconnect to a memory bus (with or without a memory controller), a peripheral bus, and a local bus using any of a variety of commercially available bus architectures. The system memory 906 can include read-only memory (ROM), random access memory (RAM), high-speed RAM (such as static RAM), EPROM, EEPROM, and/or the like. Additionally or alternatively, the computer 902 can include a hard disk drive, upon which program instructions, data, and the like can be retained. Moreover, removable data storage can be associated with the computer 902. Hard disk drives, removable media, etc. can be communicatively coupled to the processing unit 904 by way of the system bus 908.

The system memory 906 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 902 through one or more wired/wireless input devices, such as a keyboard, pointing and clicking mechanism, pressure sensitive screen, microphone, joystick, stylus pen, etc. A monitor or other type of interface can also be connected to the system bus 908.

The computer 902 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 902 can connect to other devices/networks by way of antenna, port, network interface adaptor, wireless access point, modem, and/or the like.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
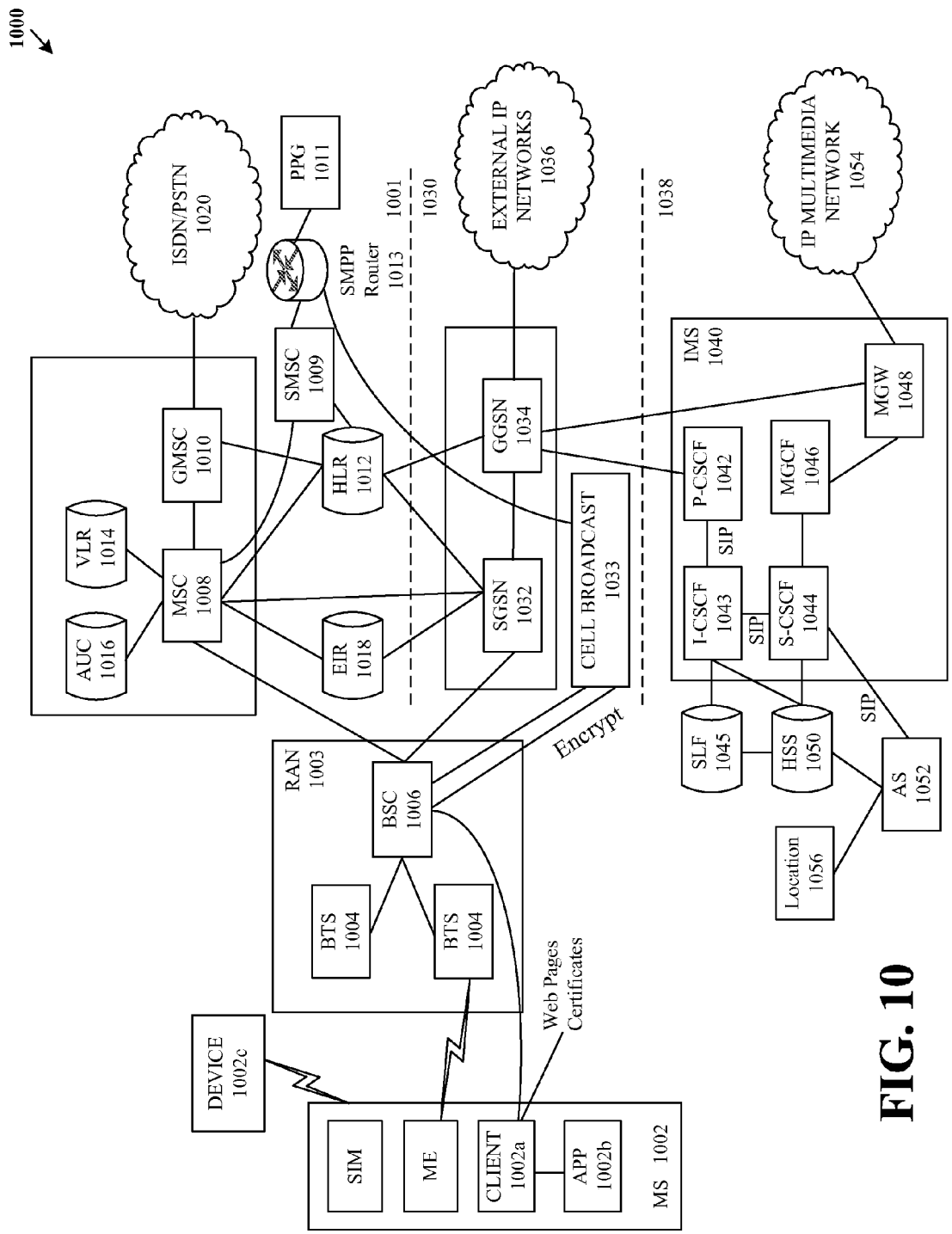
FIG. 10 illustrates a multimedia network architecture, in accordance with various embodiments disclosed herein.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA and is discuss more fully below.

The embedded client 1002a communicates with an application 1002b that provides services and/or information to an end user. One example of the application can be navigation software that provides near real-time traffic information that is received via the embedded client 1002a to the end user. The navigation software can provide road conditions, suggest alternate routes, etc. based on the location of the MS 1002. Those of ordinary skill in the art understand that there are many different methods and systems of locating an MS 1002.

Alternatively, the MS 1002 and a device 1002c can be enabled to communicate via a short-range wireless communication link, such as BLUETOOTH. For example, a BLUETOOTH SIM Access Profile can be provided in an automobile (e.g., device 1002c) that communicates with the SIM in the MS 1002 to enable the automobile's communications system to pull information from the MS 1002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1002c. There can be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, that facilitates execution of the executable instructions to perform operations, comprising:
   sending a page notification of an incoming call directed to a first device, wherein the page notification comprises data representing caller identification information associated with the incoming call; and
   in response to determining that a reply to the page notification has been received from the first device, and in response to receiving, from a subscriber device, profile data comprising an instant messaging identifier associated with a message service,
   sending a portion of the data representing the caller identification information directed to a second device using the instant messaging identifier, and, based on the profile data, publishing, via a web page specified based on input received from a subscriber associated with the subscriber device, the caller identification information and information representing a time remaining for retrieval of the caller identification information.

2. The system of claim 1, wherein the operations further comprise:
   receiving the page notification via a gateway mobile switching center device.

3. The system of claim 1, wherein the first device comprises a mobile circuit-switched device.

4. The system of claim 1, wherein the operations further comprise:
   receiving the page notification from a mobile circuit-switched device.

5. The system of claim 1, wherein the operations further comprise:
   receiving the page notification from a cellular device.

6. The system of claim 1, wherein the caller identification information comprises a phone number assigned to an originating device.

7. The system of claim 1, wherein the operations further comprise storing the profile data in a data storage device.

8. The system of claim 7, wherein the operations further comprise sending the caller identification information directed to the second device according to the profile data.

9. The system of claim 1, wherein the operations further comprise sending the caller identification information via electronic mail.

10. The system of claim 1, wherein the operations further comprise sending the caller identification information via a text-based message.

11. The system of claim 1, wherein the operations further comprise determining whether a call directed to a phone number that is associated with retrieval of the caller identification information is received.

12. A method, comprising:
    sending, by a system comprising a processor, a notification of a communication, wherein the notification comprises an identifier of the communication to a target device; and
    in response to determining that a reply to the notification was received from the target device, and in response to receiving profile information comprising an instant messaging service identifier, sending, by the system based on the instant messaging service identifier, the notification directed to an alternate device, and displaying, via a subscriber-specified web page based on the profile information, the identifier of the communication and information representing a time remaining for retrieval of the identifier of the communication.

13. The method of claim 12, wherein the sending of the notification comprises sending, in accordance with the profile information, a missed call notification associated with a missed call.

14. The method of claim 12, wherein the sending of the notification comprises sending, in accordance with the profile information, caller identification information.

15. The method of claim 12, wherein the sending of the notification comprises sending the notification directed to the alternate device via a text message.

16. The method of claim 12, wherein the sending of the notification comprises paging the target device.

17. The method of claim 12, wherein the sending of the notification comprises sending the notification directed to the alternate device via electronic mail.

18. A computer readable storage device comprising computer executable instructions that, in response to execution, cause system comprising a processor to perform operations, comprising:
    sending a notification associated with a text-based message directed to a first device, wherein the notification comprises an identifier associated with the text-based message; and
    in response to receiving a reply to the notification from the first device, and in response to determining that profile information comprising an instant messaging address associated with a messaging service was received from a subscriber device, sending data related to the identifier directed to a second device using the instant messaging address and displaying, via a web page selected based on input received from a subscriber associated with the subscriber device based on the profile information, the identifier associated with the text-based message and information representing a time remaining for retrieval of the identifier associated with the text-based message.

19. The computer readable storage device of claim 18, further comprising:
 in response to determining that the first device is configured to communicate voice data, storing the data.

20. The computer readable storage device of claim 18, wherein the sending of the data comprises sending an instant messaging service message.

\* \* \* \* \*